United States Patent
Cousins et al.

(10) Patent No.: US 6,539,542 B1
(45) Date of Patent: Mar. 25, 2003

(54) SYSTEM AND METHOD FOR AUTOMATICALLY OPTIMIZING HETEROGENOUS MULTIPROCESSOR SOFTWARE PERFORMANCE

(75) Inventors: David Bruce Cousins, Barrington, RI (US); Matthew Paul Daily, Newport, RI (US); Christopher Burbank Lirakis, Portsmouth, RI (US)

(73) Assignees: Verizon Corporate Services Group Inc., New York, NY (US); Genuity Inc., Burlington, MA (US)

( * ) Notice: Subject to any disclaimer, the term of this patent is extended or adjusted under 35 U.S.C. 154(b) by 0 days.

(21) Appl. No.: 09/421,714

(22) Filed: Oct. 20, 1999

(51) Int. Cl.[7] ............................................. G06F 9/45
(52) U.S. Cl. ........................ 717/151; 717/143; 709/104
(58) Field of Search ................................. 717/140, 143, 717/151; 709/102, 104, 105, 203, 226; 712/28; 706/13; 702/64

(56) References Cited

U.S. PATENT DOCUMENTS

| | | | | |
|---|---|---|---|---|
| 4,590,555 A | * | 5/1986 | Bourrez | 709/103 |
| 5,103,393 A | * | 4/1992 | Harris et al. | 709/104 |
| 5,283,897 A | * | 2/1994 | Georgiadis et al. | 709/105 |
| 5,301,324 A | * | 4/1994 | Dewey et al. | 709/105 |
| 5,452,461 A | * | 9/1995 | Umekita et al. | 717/140 |
| 5,590,063 A | * | 12/1996 | Golio et al. | 702/64 |
| 5,745,757 A | * | 4/1998 | Lecourtier | 709/102 |
| 5,822,570 A | * | 10/1998 | Lacey | 717/143 |
| 5,838,968 A | * | 11/1998 | Culbert | 709/104 |
| 5,848,402 A | * | 12/1998 | Pao et al. | 706/13 |
| 6,009,507 A | * | 12/1999 | Brooks et al. | 712/28 |
| 6,078,945 A | * | 6/2000 | Hinsley | 709/102 |
| 6,112,023 A | * | 8/2000 | Dave et al. | 709/226 |
| 6,185,601 B1 | * | 2/2001 | Wolff | 709/203 |
| 6,205,465 B1 | * | 3/2001 | Shoening et al. | 709/102 |
| 6,321,317 B1 | * | 11/2001 | Boronsky et al. | 709/105 |
| 6,347,366 B1 | * | 2/2002 | Cousins | 709/104 |

OTHER PUBLICATIONS

Oppenheim, Alan V., et al., "Digital Signal Processing," Prentice–Hall, Inc. (1975).

* cited by examiner

Primary Examiner—Tuan Q. Dam
Assistant Examiner—John Q. Chavis
(74) Attorney, Agent, or Firm—Leonard Charles Suchyta; James K. Weixel

(57) ABSTRACT

A method and apparatus is disclosed for optimizing the mapping of processes within a parallelized software program among individual processors in a high performance, scalable computing system. The resulting mapping enhances the usage of the available inter-processor communications bandwidth and balances the computational processing load among the processors of the system, improving upon mappings generated by skilled programmers.

60 Claims, 5 Drawing Sheets

SYSTEM AND METHOD FOR AUTOMATICALLY OPTIMIZING HETEROGENOUS MULTIPROCESSOR SOFTWARE PERFORMANCE

STATEMENT REGARDING FEDERALLY SPONSORED RESEARCH OR DEVELOPMENT

This invention was made with Government support under Contract No. F30602-97-C0296, awarded by the U.S. Air Force. The Government has certain rights in this invention.

FIELD OF THE INVENTION

The present invention relates to a system and method for optimizing software performance, and more particularly to using evolutionary algorithms to automatically allocate application processing in complex multiprocessor environments.

DESCRIPTION OF RELATED ART

Allocating application processing among the various processors in complex multiprocessor systems to achieve optimum performance is an extremely difficult problem. When developing applications for multi-processing systems, the software design is driven both by algorithmic considerations and by system performance considerations. With modern multi-stage interconnect systems (e.g., Mercury's RACEWAY, Sky's SkyChannel, and the Intel Paragon) the effect of inter-processor data routing on system performance is often difficult, if not impossible to predict, particularly for large systems.

As an example, consider the Simple Signal Processing (SSP) application 100 of FIG. 1. SSP application 100 includes a plurality of "matched" filters 110, a plurality of 2-D Fast Fourier Transform (FFT) beamformers 120, and a plurality of detectors 130. The output of every processor in each stage is broadcast to all processors in the next stage via data broadcasting functions 140 and 150. Data from M channels are fed through a simple time domain matched filter 110 using an overlap-add FFT technique (FFT length N). The overlap-add technique is a conventional signal processing technique as discussed in *Digital Signal Processing* by Alan V. Oppenheim and Ronald W. Schafer, Prentis Hall, Copyright 1975, incorporated herein by reference. All channels of each sample time are then fed or broadcast, via data broadcasting function 140 to a simple 2-D FFT beamformer 120, producing B beams. The beam data is then broadcast via data broadcasting function 150 to a simple threshold detector 130 that sets thresholds in each beam by examining adjacent beams.

Mapping this algorithm onto P processors involves the consideration of several tradeoffs, such as the size of the individual tasks, the relative speed of the processors, the interconnect, and the location of processors on the interconnect topology. Task size is chosen to maximize processor usage and minimize idle time. The ability to keep these processors busy is driven by the ability of the interconnect to move input and output data from functional units operating on different processors. Balancing I/O requirements and task processing size requires balancing utilization of the interconnection bandwidth and the processor execution speed. Proper placement of functional components on the multiprocessor can reduce the amount of communication necessary by confining intermediate results to a single processor. Many modern multi-processor connection circuitry divide the processor pool into sub-groups in such a way that communication with processors that are closely located is preferable (in terms of contention and speed) to communication with more remote processors. This affects function placement by imposing a preferred assignment so that functions that must share data are located close to one another.

Using the SSP application 100 as an example to illustrate the tradeoffs inherent in the processor placement, divide the filter processing into M parallel filters. Similarly, divide the beamformers 120 into S tasks, each generating all the beams for one time sample. Finally, break the detectors 130 into B parallel tasks, again one per beam. Thus, we would have M+S+B=T parallel tasks.

Several problems arise with this assignment scheme. First, the samples from each of the M matched filter 110 tasks must be routed to all of the B beamformer 120 tasks. Additionally, since many multiprocessor connection circuits are most efficient transferring contiguous blocks of data (as opposed to single data words), for certain systems it will be far more efficient to have the beamformer 120 tasks work on a contiguous block of samples (as opposed to single time slices). To simplify programming, this block size is often tied to the size of the FFT used for the matched filter 110 convolution (usually N divided by a power two), and is chosen to correspond to an efficient transfer block size. Therefore, the number of parallel tasks for beamforming becomes $N/2^i$, where i is a design parameter. Finally, the output of the beamformer 120 tasks must each be sent to some of the B detectors 130, since these detectors use neighboring beams for threshold setting (in the most extreme case, all the beams would be used for each detection). Again, for performance and programming simplicity, this is best done in blocks.

An engineer with some knowledge of the system can make reasonable estimates for allocating application processing to achieve optimum performance given these processing parameters. However, optimum selections of these values will vary from machine to machine, and usually have to be determined by manually timing the tasks and hand-tuning the values. The difficulty of the problem rapidly increases with the number of processors that need to be allocated. With many modern applications requiring hundreds of processors, the manual approach is beyond the capability of even the most skilled engineer.

SUMMARY OF THE INVENTION

A method consistent with the present invention optimizes the allocation of processes among a plurality of processors in a target system. In operation, the method first generates a random population of trial allocations of the processes among the plurality of processors in a target system. Next, a fitness score is determined for each of the trial allocations. Then, a new trial allocation is created based on at least one of the trial allocations in the existing population. Finally, the system identifies the trial allocation having the best score.

Additional desires, features and advantages of the invention are set forth in the following description, apparent from the description, or may be learned by practicing the invention.

Both the foregoing general description and the following detailed description are exemplary and explanatory and are intended to provide further explanation of the invention as claimed.

DESCRIPTION OF THE DRAWINGS

The accompanying drawings, that are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

In the following detailed description of the preferred embodiment, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limited sense.

A method consistent with the present invention optimizes the mapping of processes within a parallelized software program among individual processors in a high performance, scalable computing system. The resulting mapping enhances the usage of the available inter-processor communications bandwidth and balances the computational processing load among the processors of the system, improving upon mappings generated by skilled programmers. The system consists of a genetic algorithm optimizer (e.g., the Embedded Genetic Allocator (EGA)) that reconfigures an inter-processor communication mechanism to map processes. Any inter-processor communication mechanism can be utilized, but for the sake of clarity this specification will refer to the Message Passing Interface (MPI) standard. The programmer writes the program using augmented MPI communicator calls and does not need to know the underlying multiprocessor interconnection details. The EGA manipulates the allocations of processors among these communicators in an effort to minimize the execution time of time-critical portions of the target system. Trial allocations are evaluated directly on the target hardware using timing measurements to provide the "optimizer cost function" necessary for the EGA to select the best processor allocation from competing allocations.

An embedded genetic allocator (EGA) consistent with the present invention manipulates a population of trial "system design blueprints", each representing an allocation of the software's tasks among the various processors in the system. These trial blueprints are translated by EGA into input files that are automatically loaded by the target system to be optimized. Run-time event collection generates performance data that the EGA uses to score the trial allocation. A genetic algorithm (GA) is used to generate new trial blueprints based on the feedback provided by the performance evaluation.

Figure 2:
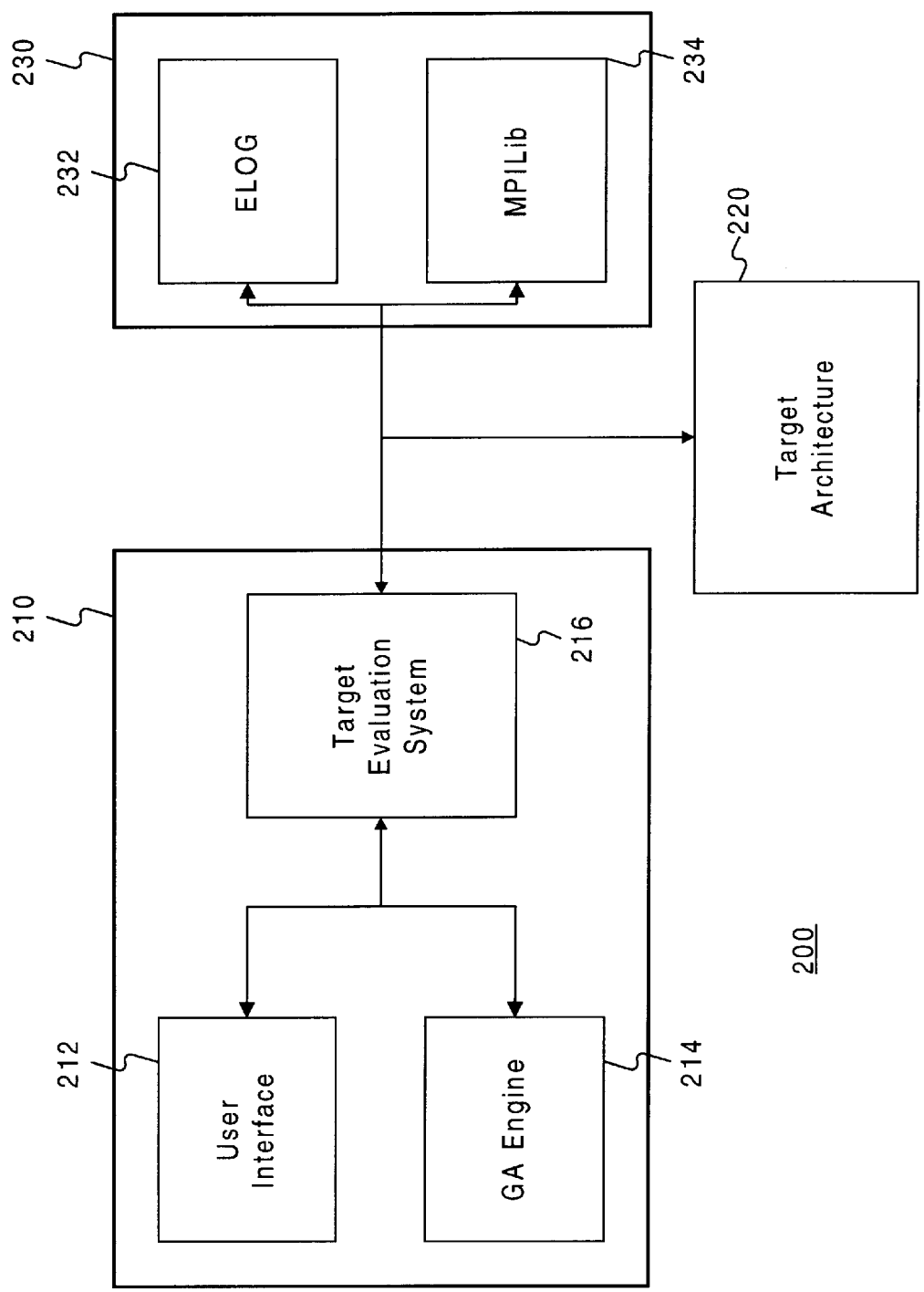
FIG. 2 is a block diagram of an embedded genetic allocator (EGA) in accordance with the present invention.

FIG. 2 is a diagram of an EGA system 200 consistent with the present invention. EGA system 200 consists of several software components. Two of these components are embedded in the software being optimized. The first is an enhanced Message Passing Interface (MPI) library 234, an off-the-shelf inter-processor communication layer. Throughout this specification, we refer to this component as the Message Passing Interface (MPI) library 234. However, as is known by those skilled in the art, any off-the-shelf inter-processor communication layer would suffice. For example, Mercury's PAS processor pools, and the PVM process groups could replace MPI as the inter-processor communication layer. The second embedded component is an event-logging library (ELOG) 232 that is used to instrument key portions of the code for run-time performance monitoring. The remaining components of the EGA system 200 run on a host workstation 210 connected to the target architecture 220. The first host component is a Genetic Algorithm (GA) engine 214 that generates the trial allocations. The second is a Target Evaluation System (TES) 216 that executes the trials on the target architecture 220 and mediates communication between the target architecture 220, the GA engine 214, and the user via the graphical user interface 212.

Figure 5:
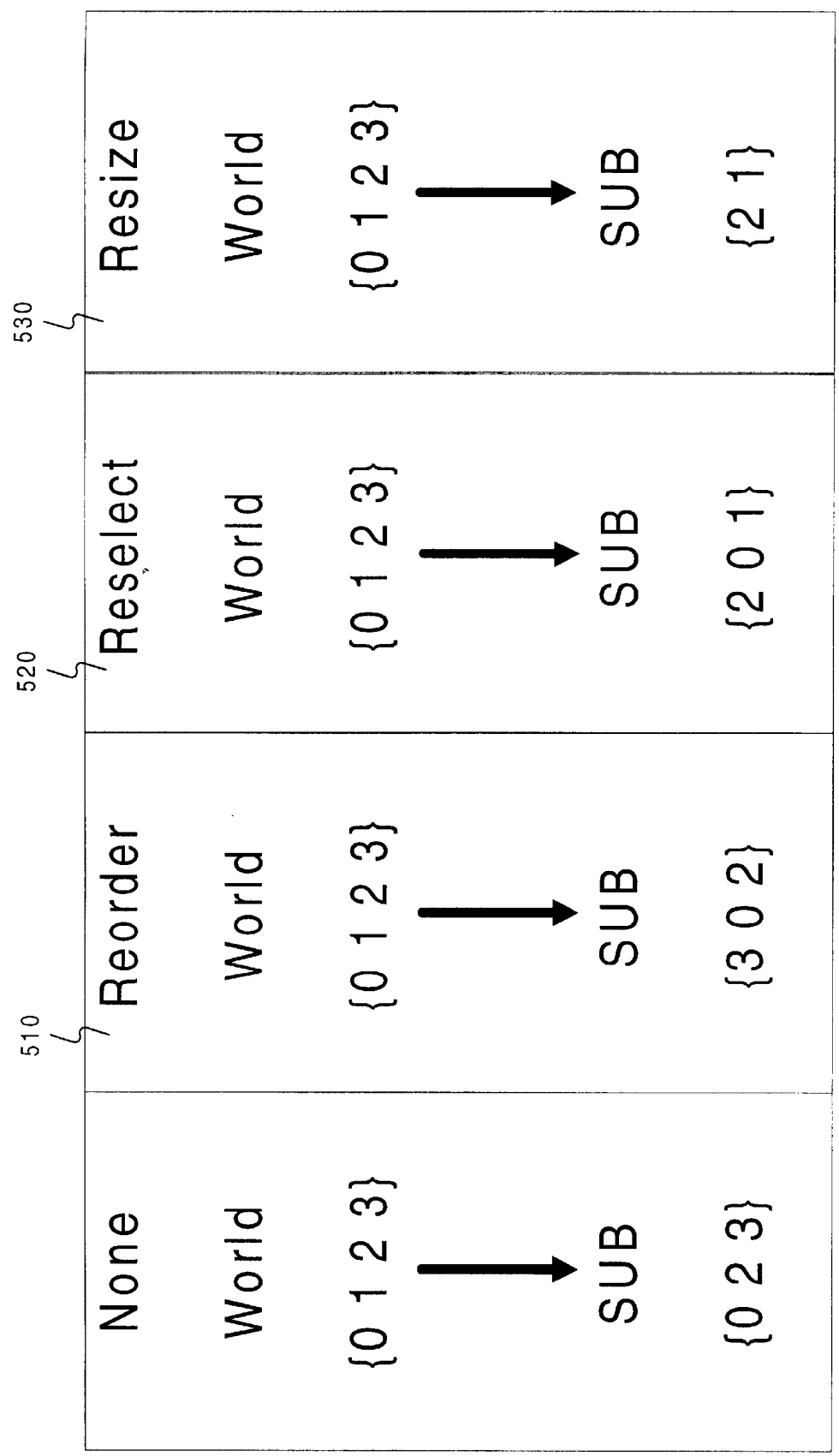
FIG. 5 is chart showing the degrees of freedom for a typical SSP Communicator.

MPI Library 234 is a standard library and is available in public domain implementations and as part of many high performance computing operating systems. A central notion of MPI Library 234 is the idea of a communicator, that is a collection of processes that allow libraries to send and receive messages that are only known to the library. They are capable of performing both point to point (i.e. send and receive) and collection operations (i.e. barrier synchronization, data broadcast, and data reduction). Each communicator ranks its processors from 0 to X–1 (where X equals the number of processors). The numbering of a specific processor in one communicator need not have any relationship to that in another. MPI Library 234 provides for creating a communicator whose processor membership is comprised of a sub-set or sub of another communicator. MPI Library 234 also provides a routine for splitting a communicator into some number of mutually exclusive sub-sets of processors according to a key called color. The root of all communicators is a pre-defined communicator consisting of all processors entitled the world communicator. The world communicator as shown in FIG. 5 (to be discussed later) is the set of processors comprising the numbers 0, 1, 2, and 3.

Figure 1:
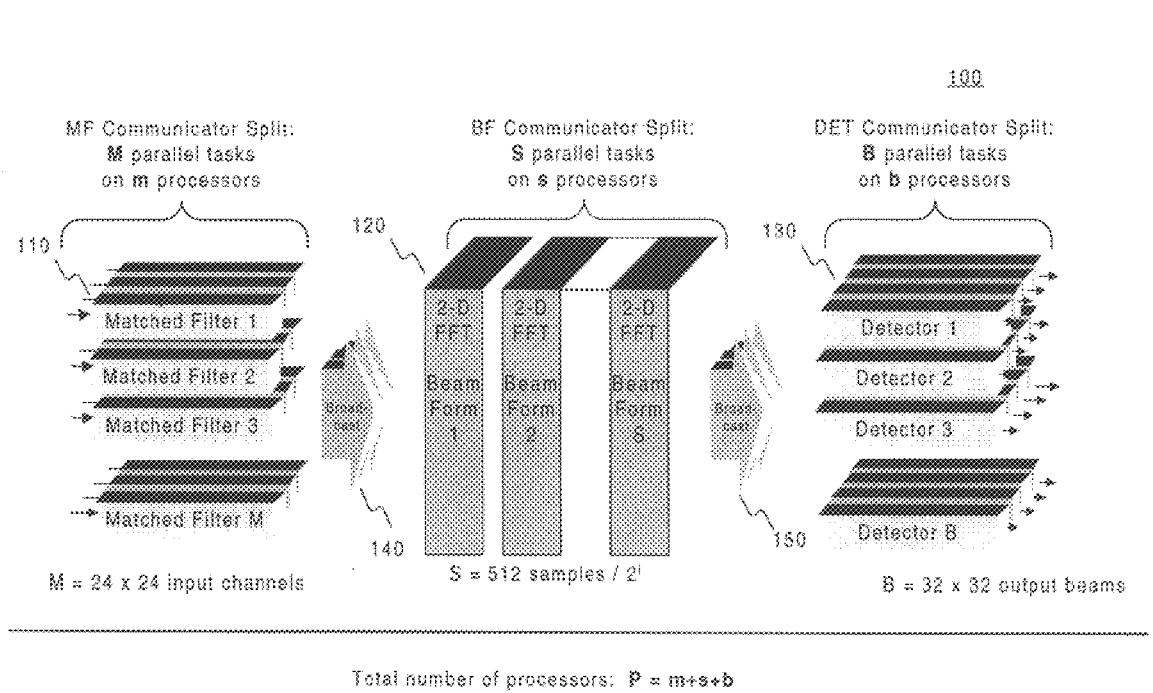
FIG. 1 is a block diagram of a simple signal processor (SSP) application.

In the earlier SSP example, a single call to a function of MPI Library 234 could be used to divide all the available processes into 3 sub-groups (MPI colors) of the MPI world communicator. These are termed the Matched Filter (MF) 110, Beam-forming (BF) 120, and Detection (Det) 130 groups. Each group is responsible for executing one stage of the processing. The number of processors in each group are indicated by m, s, and b, respectively in FIG. 1. MPI Library 234 takes care of all the task assignment overhead, allocating the M matched filter tasks to the group of m processors. Similarly s processors do S beamforming tasks, and b processors do B detector tasks.

Figure 3:
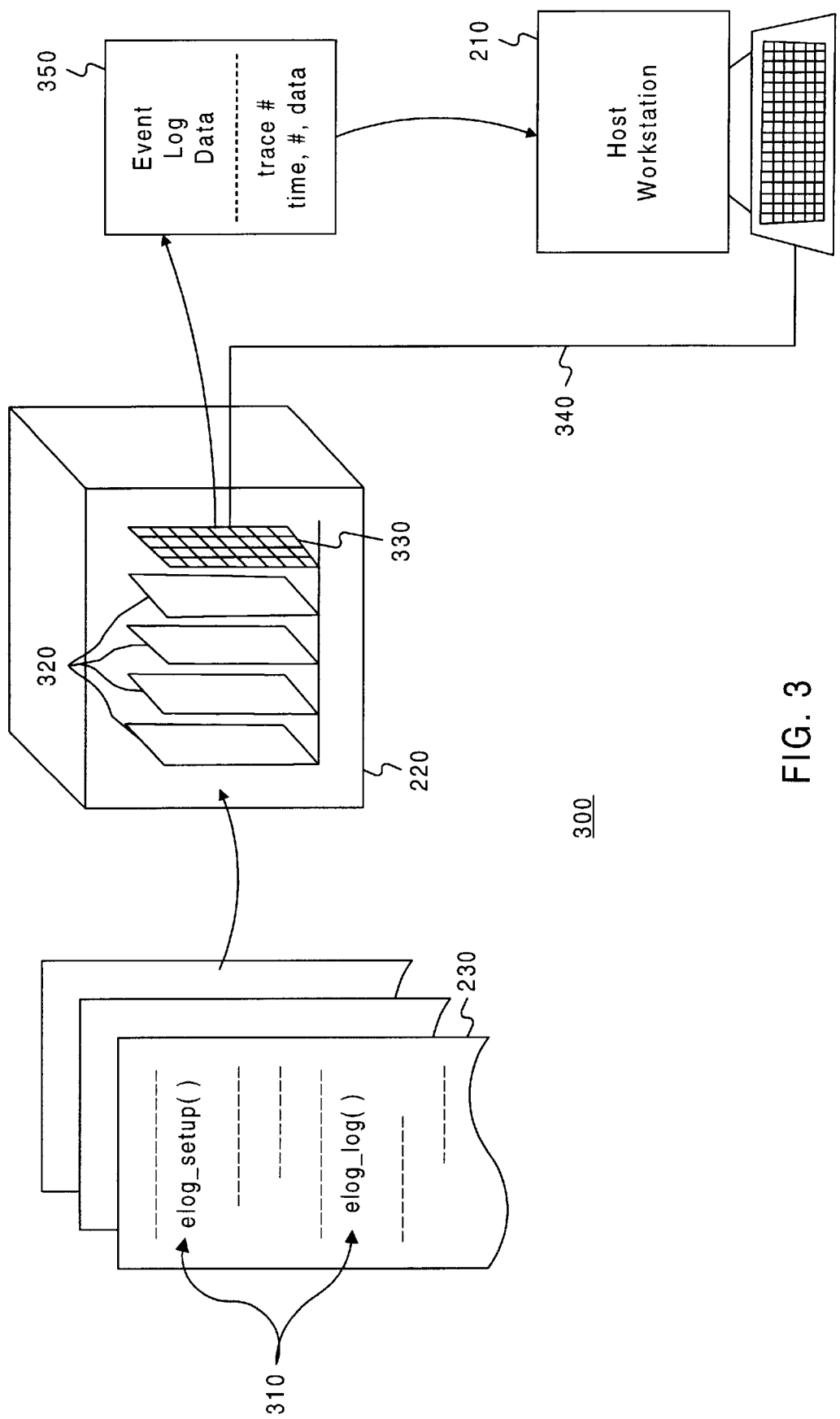
FIG. 3 is a block diagram of a process for optimizing the mapping of processes using the EGA of FIG. 2.

FIG. 3 shows a block diagram of an event logging system 300 in accordance with the present invention. While this specification describes the use of event logging system 300, it is important to note that any timing capability can be utilized, including software functions provided by the operating system that monitor the system clock. As shown in FIG. 3, target code 230 is modified to include ELOG calls 310 for recording events. For example, a user can define states by denoting pairs of starting and stopping events for each state. States are used to measure execution time of loops or function calls in the target code 230 under optimization. Target code 230 is then run on target architecture 220, that can include one or more application processors 320. Target architecture 220 preferably includes an event logging board 330 for collecting and uploading event data to be stored in an event log 350. The user's program should preferably iterate over these functions enough times to generate meaningful statistics for the state durations. Using event logging board 330, event logging system 300 collects the traces generated by each application processor 320 and generates event log 350, that can be written to a disk on host computer 210 via a data connection 340, such as an Ethernet connection.

TES 216 (FIG. 2) can be implemented as a program that controls the target system processes and mediates communication between those processes and GA engine 214. GA engine 214 can be implemented as a program that creates trial allocation blueprints using GA techniques (described in more detail below). A graphical user interface (GUI) 212 enables the user to configure and run the system, and monitor the status of an optimization run.

Figure 4:
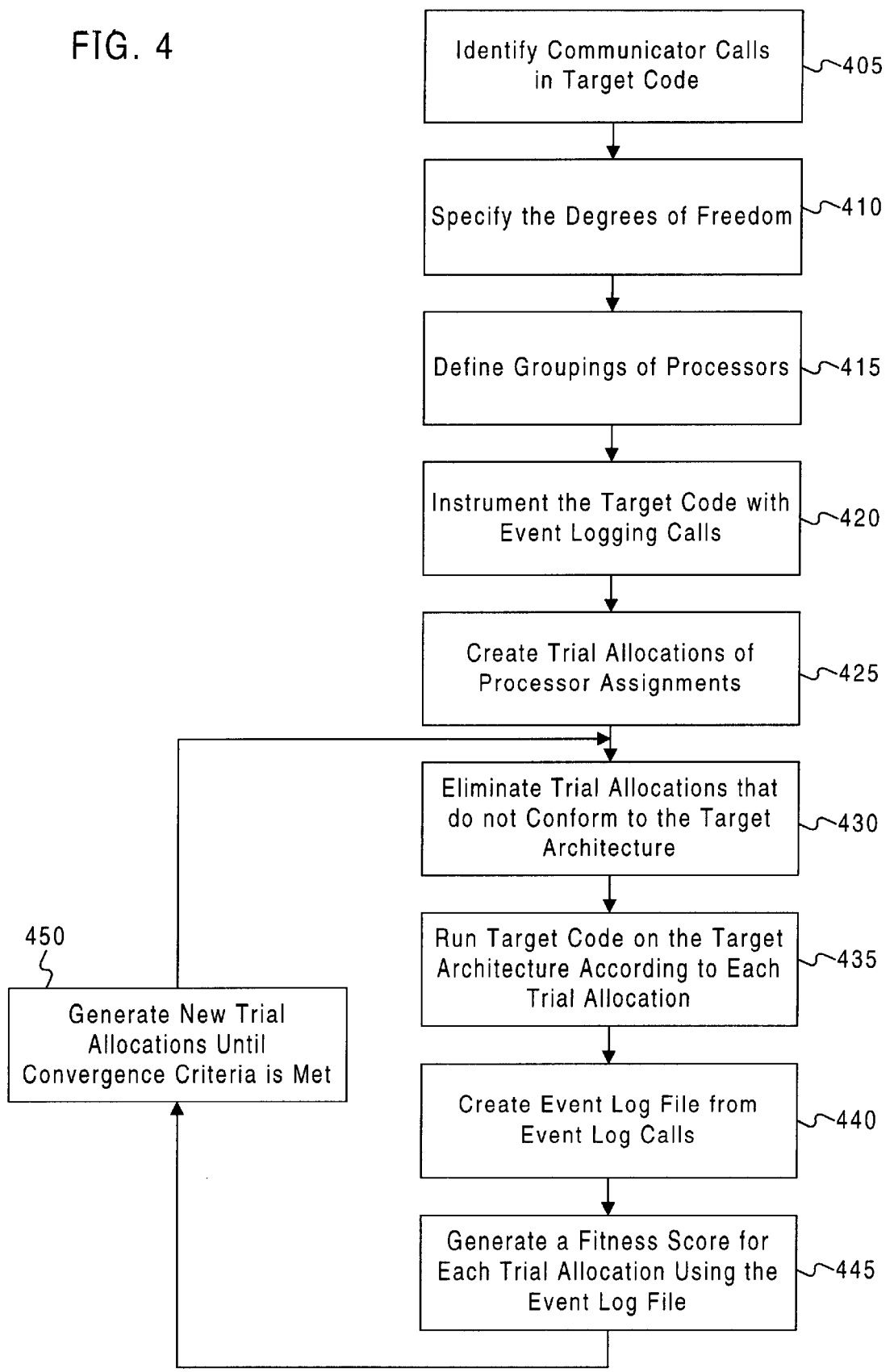
FIG. 4 is a block diagram of an event logging system in accordance with the present invention.

FIG. 4 shows a flow diagram of the process for optimizing the mapping of processes within a parallelized software program among the individual processors in a scalable computing system. First, the programmer manually identifies the key processes or tasks within the target code 230 by placing wrappers (EGA-specific code) around MPI communicator calls (step 405). To constrain the optimization problem (thus speeding up the convergence to a near-optimal solution), the user next specifies the degrees of freedom allowed to the EGA system 200 when manipulating the processor membership in a communicator (step 410). The degrees of freedom are used to determine subsequent trial allocations by either expanding or limiting the number of permutations that can be made to the current trial allocation. As shown in FIG. 5, three degrees of freedom, or three levels of constraints are allowed: (1) the lowest level of freedom is re-order (510). Re-ordering keeps processor membership constant with a communicator but permutes the processor's rank. This can optimize processor placement within an multiprocessor and is most valuable when data transfer times within the inter-processor connection circuitry is non-uniform. Referring to FIG. 5, re-ordering entails simply shifting the order of the processors without adding or deleting any processors. In other words, the collection of processors (0, 2, and 3) remain constant, but their order/rank can change; (2) the next freedom level is re-select (520). Re-selection keeps the communicator size constant, and varies processor membership. Again referring to FIG. 5, the collection of processors can be any 3-processor aggregation of processors 0, 1, 2, or 3. Re-selection is most useful when there are multiple communicators of fixed size whose processor membership may or may not overlap. It is also useful for redistributing the data transfer load within the connection circuitry in order to avoid congestion; (3) the most versatile level of freedom is re-size (530). Re-sizing allows communicator size to vary. Resizing allows the EGA to optimize both load balancing among the available processors and utilization of the inter-processors connection circuit topology. As shown in FIG. 5, re-sizing allows for any collection of any size of sub-communicator available. Specifying the degrees of freedom allows a user to impart experience and intuition to either enlarge or reduce the scope of the trial allocations produced. An MPI-communicator then assigns processors to task groups according to an EGA-generated trial allocation (these trials are frequently referred to as chromosomes because they are generated by GA engine 214 (step 415).

The user next instruments the code for optimization (step 420) with Event logging library (ELOG) 232 by bracketing key portions of the target code 230 with low-overhead function calls that generate time-stamped events that are used to derive performance statistics about the software. As an example, the event logging can be performed with the use of an external monitoring system, such as TraceMaker™ (a product of BBN Corporation), that performs synchronized time-stamp management, off-loads all the event logging overhead from the target processors, and requires minimal overhead to log an event (<10 microseconds). The monitoring system gathers this event data and generates an event log file on host system 210. All the events produced by a given process are stored together in a trace. A more detailed description of the TraceMaker™ can be found in U.S. Pat. No. 5,682,328 to Frederick Roeber et al., entitled, "Centralized Computer Event Data Logging System," that is assigned to BBN Corporation and is incorporated herein by reference.

Next, the GA engine 214 creates trial allocation blueprints or chromosomes (step 425). To create a trial chromosome, the GA engine 214 performs a single design rule check (step 430) to eliminate allocations that are invalid due to physical constraints (for example, a trial allocation or chromosome with no processors allocated to one of the communicators). Allocations failing this check receive a poor score and are not tested on the target system 220. If the trial chromosome passes the design rule then TES 216 runs the target code 230 on the target architecture 220 (step 435). The MPI library 234 uses this processor allocation scheme for the run, and the ELOG library 232 sends performance data to the TraceMaker™ system (step 440). The TES 216 monitors both the target code and the TraceMaker™ system and notifies the GA engine 214 upon run completion. The GA engine 214 then uses the TraceMaker™ event log file to generate a fitness score (also known as the optimizer cost function) for that allocation (step 445).

Each loop iteration uses an input chromosome that directs a new processor assignment, resulting in different execution performance. The augmented communicator creation calls operate in two distinct modes. On the first iteration, the system is in an initialization mode. Here, calls to the augmented MPI library 234 produce the same results as normal MPI calls would, generating a file that describes the initial default MPI processor allocations. This file also includes user-supplied flags that specify the amount of freedom allowed the EGA when it generates new trial allocations (see below). On subsequent iterations, the system works in a runtime mode, where the augmented MPI library 234 redefines the communicator membership based on trial chromosomes generated by the GA engine 214 on the host system 210.

The whole process iterates as the GA engine 214 generates new trials, until one of the convergence criteria is met (step 450). Three user-selectable convergence criteria are available. The first, a specified fitness score is achieved. The second, a fixed number of iterations has elapsed. The third, the population has converged. Population convergence is defined by comparing the fitness of the best against the worst scores in the population. If this difference has not changed by a specific percentage with a specified number of iterations, then termination is reached. Other convergence criteria in addition to those described above can also be used.

The GA approach to optimization is based on automatically generating and evaluating different solutions to a problem in a controlled fashion until a solution satisfying the desired constraints is found. EGA system 200 produces and evaluates a trial processor allocation during each iteration of its GA. Once an initial population of randomly generated population schemes is created, the population having a fixed size established by the user, the GA produces new allocation schemes by either combining portions of two previously generated schemes or by randomly perturbing an existing scheme. Parent chromosomes are selected from the population of previously evaluated chromosomes using Darwinian selection (probability of selection is proportional to the quality of the parent's evaluation). Evaluated chromosomes are placed back into the population in a steady-state method (fixed population size, more "fit" chromosomes replace those less fit).

In general, optimization implies some single measure (cost function or fitness score) to be maximized or minimized. In the case of the EGA system 200, optimizing for maximum software performance is equivalent to minimizing the software's execution time as measured by the real-time event monitoring system. These measurements are use to derive a single fitness score for a trial allocation.

The GA engine 214 uses the event log to calculate the duration of the states in all traces. It then calculates the overall fitness score of the run by combining the state timing information according to user-specified criteria that determine which statistical and combinatorial operators are used for calculations.

The timings for all the instances of a state within a single trace are combined into a single state value by taking the average, sum, minimum, maximum, or standard deviation of all the state durations in that trace. The resulting values of each of the states in trace are then combined using one of the aforementioned operations to produce a single value for each trace. Finally, the trace values are combined into a single fitness score in a similar way. Thus, state duration may be used to optimize for minimum execution time, minimum data transfer latency, etc.

The trial solutions to the processor allocation problem need to be encoded in a form that the GA engine 214 can manipulate. This encoding is commonly referred to as blueprint encoding in which an ordered chromosome is used to represent internally the processor allocation to the user's MPI communicators. In operation, the EGA reads in the file containing the description of the MPI structure defined in the user's software. All communicators with the same parent are grouped and sorted. Given P processors and W communicators with $C_w$ colors in each communicator, there are W substrings in the chromosome, each with $P+C_w-1$ elements. As previously mentioned, a color is a mutually exclusive sub-set of processors from a specific communicator. Each position in the substring nominally corresponds to a position in the processor list of the corresponding communicator, with the value at that position corresponding to a unique processor ID number. However, the extra $C_w-1$ elements in the substring act as tokens used to delineate the division of processors among the colors of split communicators when resize is enabled. As a specific example, for the 30 processor SSP problem, P=30, W=1, $C_w$=3, so there are 32 elements in the chromosome representing the problem.

The algorithm used by the EGA to allocate processors based on this chromosome is summarized below.

For each unique communicator W:{
k=P+($C_w$−1)
g(1 . . . k)=next substring of chromosome
Select first color in communicator as current color For i=1 to k{
  if (g(i)<P){
    Assign processor g(i) to current color
  }else {
    g(i) is a token indicating color change
    increment current color to next color
  }
{
}

From the foregoing description, it will be appreciated that the present invention provides an efficient system and method for automatically optimizing heterogenous multi-processor software performance. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Although aspects of the present invention are described as being stored in memory, one skilled in the art will appreciate that these aspects can also be stored on or read from other types of computer-readable media, such as secondary storage devices, like hard disks, floppy disks, or CD-ROMs; a carrier wave from the Internet; or other forms of RAM or ROM. Similarly, the method of the present invention may conveniently be implemented in program modules that are based upon the flow charts in FIG. 4. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented method for optimizing the allocation of processes among a plurality of processors in a target system, comprising the steps of:
   generating a random population of trial allocations of the processes among the plurality of processors;
   determining a fitness score for each of the trial allocations;
   assigning at least one process to a different processor to create a new trial allocation; and
   identifying the trial allocation having the best fitness score.

2. The method of claim 1 further comprising the step of identifying a population of processes in a target system.

3. The method of claim 1 further comprising the step of repeating the determining and assigning steps until the occurrence of a predetermined event.

4. The method of claim 3, wherein the repeating step includes the step of repeating the determining and assigning steps for a predetermined number of iterations.

5. The method of claim 3, wherein the repeating step includes the step of repeating the determining and assigning steps until the best fitness score minus the worst fitness score has not changed by a predetermined percentage for a predetermined number of iterations.

6. The method of claim 1, further comprising the step of adding the new trial allocation to the existing population of trial allocations if the fitness score of the new trial allocation is better than at least one of the trial allocations in the existing population.

7. The method of claim 6, further including the step of removing a trial allocation from the existing population having a fitness score worse than the fitness score of the new trial allocation.

8. The method of claim 1, wherein the determining step is further comprised of the following steps:
   instrumenting event calls in the software program;
   running the software program on the target system;
   logging each of the event calls made during the running of the software program based on the logged event calls; and
   establishing the fitness score based on the calculated execution time.

9. A computer-implemented method for optimizing the allocation of processes among a plurality of processors in a target system, comprising the steps of:
   creating at least one sub-communicator comprising a plurality of processors in said target system, each of said processors having an associated rank;
   determining a fitness score for said at least one sub-communicator;
   permuting said rank;
   repeating the determining and permuting steps until the occurrence of a predetermined event; and
   identifying the sub-communicator having the best fitness score.

10. The method of claim 9 further comprising the step of identifying a population of processes.

11. The method of claim 9, wherein the repeating step includes the step of repeating the determining and permuting steps until the best fitness score minus the worst fitness score has not changed by a predetermined percentage for a predetermined number of iterations.

12. The method of claim 9, further comprising the step of adding the new sub-communicator to the existing population of sub-communicators if the fitness score of the new sub-communicator is better than at least one of the sub-communicators in the existing population.

13. The method of claim 12, further including the step of removing a sub-communicator from the existing population having a fitness score worse than the fitness score of the new sub-communicator.

14. The method of claim 9, wherein the determining step is further comprised of the following steps:
   instrumenting event calls in the software program;
   running the software program on the target system;
   logging each of the event calls made during the running of the software program based on the logged event calls; and
   establishing the fitness score based on the calculated execution time.

15. A computer-implemented method for optimizing the allocation of processes among a plurality of processors in a target system, comprising the steps of:
   creating at least one sub-communicator of a predetermined size, said sub-communicator comprising a plurality of processors in said target system, each of said processors having an associated rank;
   determining a fitness score for said at least one sub-communicator; and
   identifying the sub-communicator having the best fitness score.

16. The method of claim 15 further comprising the step of identifying a population of processes.

17. The method of claim 15 further comprising the step of repeating the creating and determining steps until the occurrence of a predetermined event.

18. The method of claim 17, wherein the repeating step includes the step of repeating the determining and permuting steps until the best fitness score minus the worst fitness score has not changed by a predetermined percentage for a predetermined number of iterations.

19. The method of claim 15, further comprising the step of adding the new sub-communicator to the existing population of sub-communicators if the fitness score of the new sub-communicator is better than at least one of the sub-communicators in the existing population.

20. The method of claim 19, further including the step of removing a sub-communicator from the existing population having a fitness score worse than the fitness score of the new sub-communicator.

21. The method of claim 15, wherein the determining step is further comprised of the following steps:
   instrumenting event calls in the software program;
   running the software program on the target system;
   logging each of the event calls made during the running of the software program based on the logged event calls; and
   establishing the fitness score based on the calculated execution time.

22. A computer-implemented method for optimizing the allocation of processes among a plurality of processors in a target system, comprising the steps of:
   creating at least one sub-communicator comprising a plurality of processors in said target system, each of said processors having an associated rank;
   determining a fitness score for said at least one sub-communicator; and
   identifying the sub-communicator having the best fitness score.

23. The method of claim 22 further comprising the step of identifying a population of processes.

24. The method of claim 22 further comprising the step of repeating the creating and determining steps until the occurrence of a predetermined event.

25. The method of claim 24, wherein the repeating step includes the step of repeating the creating and determining steps until the best fitness score minus the worst fitness score has not changed by a predetermined percentage for a predetermined number of iterations.

26. The method of claim 22, further comprising the step of adding the new sub-communicator to the existing population of sub-communicators if the fitness score of the new sub-communicator is better than at least one of the sub-communicators in the existing population.

27. The method of claim 26, further including the step of removing a sub-communicator from the existing population having a fitness score worse than the fitness score of the new sub-communicator.

28. The method of claim 22, wherein the determining step is further comprised of the following steps:
   instrumenting event calls in the software program;
   running the software program on the target system;
   logging each of the event calls made during the running of the software program based on the logged event calls; and
   establishing the fitness score based on the calculated execution time.

29. A computer system for optimizing the allocation of processes among a plurality of processors in a target system, comprising:
   a memory having program instructions; and
   a processor configured to use the program instructions to generate a random population of trial allocations of the processes among the plurality of processors; to determine a fitness score for each of the trial allocations; to assign at least one process to a different processor; to repeat the determining and assigning instructions until the occurrence of a predetermined event; and identify the trial allocation having the best fitness score.

30. The computer system according to claim 29, wherein the processor is further configured to identify a population of processes.

31. The computer system of claim 29, wherein the processor includes the instruction to repeat the determining and assigning instructions for a predetermined number of iterations.

32. The computer system of claim 29, wherein the processor includes the instruction to repeat the determining and assigning instructions until the best fitness score minus the worst fitness score has not changed by a predetermined percentage for a predetermined number of iterations.

33. The computer system of claim 29, wherein the processor includes the instruction to add the new trial allocation to the existing population of trial allocations if the fitness score of the new trial allocation is better than at least one of the trial allocations in the existing population.

34. The computer system of claim 33, wherein the processor is further configured to removing a trial allocation from the existing population having a fitness score worse than the fitness score of the new trial allocation.

35. The computer system of claim 29, wherein the determining instruction is further comprised of the following instructions:
   instrument event calls in the software program;
   run the software program on the target system;
   log each of the event calls made during the run of the software program based on the logged event calls; and
   establish the fitness score based on the calculated execution time.

36. A computer system for optimizing the allocation of processes among a plurality of processors in a target system, comprising:
   a memory having program instructions; and
   a processor configured to use the program instructions to create a sub-communicator comprising a plurality of processors in said target system, each of said processors having an associated rank; determine a fitness score for said sub-communicator; permute said rank; repeat the determining and permuting instructions until the occurrence of a predetermined event; and identify the sub-communicator having the best fitness score.

37. The computer system of claim 36 wherein the processor is further configured to identify a population of processes.

38. The computer system of claim 36, wherein the processor is further configured to repeat the determining and permuting instructions until the best fitness score minus the worst fitness score has not changed by a predetermined percentage for a predetermined number of iterations.

39. The computer system of claim 36, wherein the processor is further configured to add the new sub-communicator to the existing population of sub-communicators if the fitness score of the new sub-communicator is better than at least one of the sub-communicators in the existing population.

40. The computer system of claim 39, wherein the processor is further configured to remove a sub-communicator from the existing population having a fitness score worse than the fitness score of the new sub-communicator.

41. The computer system of claim 36, wherein the determining instruction is further comprised of the following instructions:
   instrument event calls in the software program;
   run the software program on the target system;
   log each of the event calls made during the run of the software program based on the logged event calls; and
   establish the fitness score based on the calculated execution time.

42. A computer system for optimizing the allocation of processes among a plurality of processors in a target system, comprising:
   a memory having program instructions; and
   a processor configured to use the program instructions to create a sub-communicator of a predetermined size, said sub-communicator comprising a plurality of processors in said target system, each of said processors having an associated rank; determine a fitness score for said sub-communicator; repeat the creating and determining instructions until the occurrence of a predetermined event; and identify the sub-communicator having the best fitness score.

43. The computer system of claim 42 wherein the processor is further configured to identify a population of processes.

44. The computer system of claim 42, wherein the processor is further configured to repeat the determining and permuting instructions until the best fitness score minus the worst fitness score has not changed by a predetermined percentage for a predetermined number of iterations.

45. The computer system of claim 42, wherein the processor is further configured to add the new sub-communicator to the existing population of sub-communicators if the fitness score of the new sub-communicator is better than at least one of the sub-communicators in the existing population.

46. The computer system of claim 45, wherein the processor is further configured to remove a sub-communicator from the existing population having a fitness score worse than the fitness score of the new sub-communicator.

47. The computer system of claim 42, wherein the determining instruction is further comprised of the following instructions:
   instrument event calls in the software program;
   run the software program on the target system;
   log each of the event calls made during the run of the software program based on the logged event calls; and
   establish the fitness score based on the calculated execution time.

48. A computer system for optimizing the allocation of processes among a plurality of processors in a target system, comprising:

a memory having program instructions; and a processor configured to use the program instructions to create a sub-communicator comprising a plurality of processors in said target system, each of said processors having an associated rank; determine a fitness score for said sub-communicator; repeat the creating and determining instructions until the occurrence of a predetermined event; and identify the sub-communicator having the best fitness score.

49. The computer system of claim 48 wherein the processor is further configured to identify a population of processes.

50. The computer system of claim 48, wherein the processor is further configured to repeat the creating and determining instructions until the best fitness score minus the worst fitness score has not changed by a predetermined percentage for a predetermined number of iterations.

51. The computer system of claim 48, wherein the processor is further configured to add the new sub-communicator to the existing population of sub-communicators if the fitness score of the new sub-communicator is better than at least one of the sub-communicators in the existing population.

52. The computer system of claim 51, wherein the processor is further configured to remove a sub-communicator from the existing population having a fitness score worse than the fitness score of the new sub-communicator.

53. The computer system of claim 48, wherein the determining instruction is further comprised of the following instructions:

instrument event calls in the software program;

run the software program on the target system;

log each of the event calls made during the run of the software program based on the logged event calls; and establish the fitness score based on the calculated execution time.

54. A system for optimizing the allocation of processes among a plurality of processors in a target system, comprising:

means for generating a random population of trial allocations of the processes among the plurality of processors;

means for determining a fitness score for each of the trial allocations;

means for assigning at least one process to a different processor;

means for repeating the execution of the means for determining and means for assigning until the occurrence of a predetermined event; and means for identifying the trial allocation having the best fitness score.

55. The system according to claim 54 further comprising means for identifying a population of processes.

56. The system according to claim 54, wherein the means for repeating includes means for repeating the execution of the means for determining and means for assigning for a predetermined number of iterations.

57. The system according to claim 54, wherein the means for repeating step includes means for repeating the execution of the means for determining and means for assigning until the best fitness score minus the worst fitness score has not changed by a predetermined percentage for a predetermined number of iterations.

58. The system according to claim 54, further comprising means for adding the new trial allocation to the existing population of trial allocations if the fitness score of the new trial allocation is better than at least one of the trial allocations in the existing population.

59. The system according to claim 58, further comprising means for removing a trial allocation from the existing population having a fitness score worse than the fitness score of the new trial allocation.

60. The system according to claim 54, wherein the means for determining is further comprised of:

means for instrumenting event calls in the software program;

means for running the software program on the target system;

means for logging each of the event calls made during the running of the software program based on the logged event calls; and means for establishing the fitness score based on the calculated execution time.

* * * * *